United States Patent
Dixon et al.

(10) Patent No.: US 9,417,880 B2
(45) Date of Patent: Aug. 16, 2016

(54) INSTRUCTION FOR PERFORMING AN OVERLOAD CHECK

(71) Applicant: Intel Corporation, Santa Clara, CA (US)

(72) Inventors: Martin Dixon, Portland, OR (US); Baiju Patel, Portland, OR (US); Rajeev Gopalakrishna, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 585 days.

(21) Appl. No.: 13/843,558

(22) Filed: Mar. 15, 2013

(65) Prior Publication Data

US 2014/0281406 A1    Sep. 18, 2014

(51) Int. Cl.
*G06F 9/30* (2006.01)
*G06F 9/40* (2006.01)
*G06F 9/38* (2006.01)

(52) U.S. Cl.
CPC .......... *G06F 9/3838* (2013.01); *G06F 9/30014* (2013.01); *G06F 9/30076* (2013.01); *G06F 9/3861* (2013.01)

(58) Field of Classification Search
CPC . G06F 9/30014; G06F 9/3861; G06F 9/3838; G06F 9/30076
USPC ........................................................ 712/216
See application file for complete search history.

(56) References Cited

U.S. PATENT DOCUMENTS

| | | | |
|---|---|---|---|
| 3,936,804 A | 2/1976 | Bachman | |
| 5,029,069 A | 7/1991 | Sakamura | |
| 5,684,728 A | 11/1997 | Okayama et al. | |
| 2004/0225869 A1* | 11/2004 | Pagni | 712/227 |
| 2009/0070602 A1 | 3/2009 | Ingle et al. | |
| 2013/0166889 A1* | 6/2013 | Arekapudi | 712/221 |

FOREIGN PATENT DOCUMENTS

| | | |
|---|---|---|
| JP | S5093053 A | 7/1975 |
| JP | S6491228 A | 4/1989 |
| KR | 10-1998-0056300 | 9/1998 |
| KR | 10-2010-0058623 A | 6/2010 |

OTHER PUBLICATIONS

Office action with English translation from Japanese Patent Application No. 2014-051273, mailed Apr. 7, 2015, 23 pages.
Office action with English translation from Japanese Patent Application No. 2014-051273, mailed Dec. 8, 2015, 7 pages.
Office action with English translation from Korean Patent Application No. 10-2014-0031297, mailed Aug. 28, 2015, 6 pages.
Office action from Great Britain Patent Application No. GB1404537. 1, mailed Jun. 18, 2015, 2 pages.
Notification of Grant from Great Britain Patent Application No. GB1404537.1, mailed Nov. 3, 2015, 2 pages.
Office Action from counterpart GB Application No. 1404537.1, Mailed Oct. 14, 2014, 6 pages.

* cited by examiner

*Primary Examiner* — Chun-Kuan Lee
(74) *Attorney, Agent, or Firm* — Nicholson De Vos Webster & Elliott, LLP

(57) ABSTRACT

A processor is described having a functional unit within an instruction execution pipeline. The functional unit having circuitry to determine whether substantive data from a larger source data size will fit within a smaller data size that the substantive data is to flow to.

21 Claims, 7 Drawing Sheets

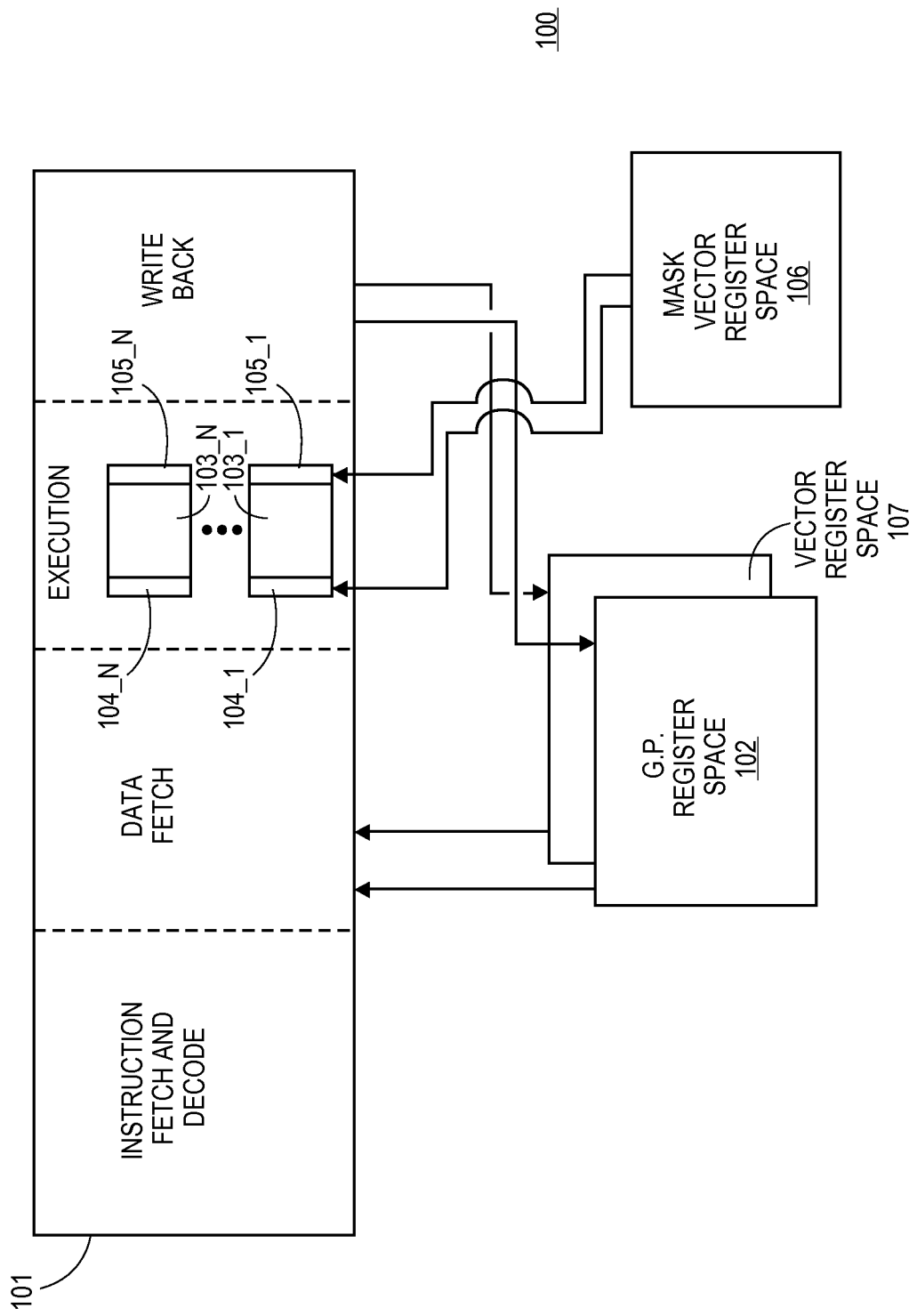

INSTRUCTION FOR PERFORMING AN OVERLOAD CHECK

FIELD OF INVENTION

The field of invention pertains generally to the computing sciences and, more specifically, to an instruction for performing an overload check.

Instruction for Performing an Overload Check

FIG. 1 shows a high level diagram of a processing core 100 implemented with logic circuitry on a semiconductor chip. The processing core includes a pipeline 101. The pipeline consists of multiple stages each designed to perform a specific step in the multi-step process needed to fully execute a program code instruction. These typically include at least: 1) instruction fetch and decode; 2) data fetch; 3) execution; 4) write-back. The execution stage performs a specific operation identified by an instruction that was fetched and decoded in prior stage(s) (e.g., in step 1) above) upon data identified by the same instruction and fetched in another prior stage (e.g., step 2) above). The data that is operated upon is typically fetched from (general purpose) register storage space 102. New data that is created at the completion of the operation is also typically "written back" to register storage space (e.g., at stage 4) above).

The logic circuitry associated with the execution stage is typically composed of multiple "execution units" or "functional units" 103_1 to 103_N that are each designed to perform its own unique subset of operations (e.g., a first functional unit performs integer math operations, a second functional unit performs floating point instructions, a third functional unit performs load/store operations from/to cache/memory, etc.). The collection of all operations performed by all the functional units corresponds to the "instruction set" supported by the processing core 100.

Two types of processor architectures are widely recognized in the field of computer science: "scalar" and "vector". A scalar processor is designed to execute instructions that perform operations on a single set of data, whereas, a vector processor is designed to execute instructions that perform operations on multiple sets of data. FIGS. 2A and 2B present a comparative example that demonstrates the basic difference between a scalar processor and a vector processor.

FIG. 2A shows an example of a scalar AND instruction in which a single operand set, A and B, are ANDed together to produce a singular (or "scalar") result C (i.e., A.AND.B=C). By contrast, FIG. 2B shows an example of a vector AND instruction in which two operand sets, A/B and D/E, are respectively ANDed together to (e.g., in parallel simultaneously) produce a vector result C, F (i.e., A.AND.B=C and D.AND.E=F). As a matter of terminology, a "vector" is a data element having multiple "elements". For example, a vector V=Q, R, S, T, U has five different elements: Q, R, S, T and U. The "size" of the exemplary vector V is five (because it has five elements).

FIG. 1 also shows the presence of vector register space 107 that is different than general purpose register space 102. Specifically, general purpose register space 102 is nominally used to store scalar values. As such, when any of execution units perform scalar operations they nominally use operands called from (and write results back to) general purpose register storage space 102. By contrast, when any of the execution units perform vector operations they nominally use operands called from (and write results back to) vector register space 107. Different regions of memory may likewise be allocated for the storage of scalar values and vector values.

Note also the presence of masking logic 104_1 to 104_N and 105_1 to 105_N at the respective inputs to and outputs from the functional units 103_1 to 103_N. In various implementations, for vector operations, only one of these layers is actually implemented—although that is not a strict requirement (although not depicted in FIG. 1, conceivably, execution units that only perform scalar and not vector operations need not have any masking layer). For any vector instruction that employs masking, input masking logic 104_1 to 104_N and/or output masking logic 105_1 to 105_N may be used to control which elements are effectively operated on for the vector instruction. Here, a mask vector is read from a mask register space 106 (e.g., along with input operand vectors read from vector register storage space 107) and is presented to at least one of the masking logic 104, 105 layers.

Over the course of executing vector program code each vector instruction need not require a full data word. For example, the input vectors for some instructions may only be 8 elements, the input vectors for other instructions may be 16 elements, the input vectors for other instructions may be 32 elements, etc. Masking layers 104/105 are therefore used to identify a set of elements of a full vector data word that apply for a particular instruction so as to affect different vector sizes across instructions. Typically, for each vector instruction, a specific mask pattern kept in mask register space 106 is called out by the instruction, fetched from mask register space and provided to either or both of the mask layers 104/105 to "enable" the correct set of elements for the particular vector operation.

FIGURES

The following description and accompanying drawings are used to illustrate embodiments of the invention. In the drawings:

FIG. 1 shows an embodiment of an instruction execution pipeline;

FIGS. 2a and 2b pertain to vector processing;

DETAILED DESCRIPTION

As is understood in the art, software algorithms generally recite actions to be taken on and/or in view of variables. Numerical data is effectively inserted into the variables so that the software can actually process the data. In computer software source code languages, such as C, the variables are declared as being one of various variable "types" (e.g., integer, floating point, etc.). The unit of memory and/or register space needed to hold a variable's data may be part of the definition of the variable's type (e.g., 32 bit, 64 bit, etc.).

A software process itself can be viewed as one of more "data flows" in which preceding data calculations feed into subsequent data calculations. Conceivably, processes involving variables of a first type will feed into processes involving variables of a different type. Problems can arise if a "larger" data type is to feed into a "smaller" data type. For example, an "overflow error" will result if a 64 bit value is to feed into a variable defined as having a size of only 32 bits.

Another type of overflow error can occur if a data value is at the maximum for its size and an attempt is made to increment the data value. For example, a value of 2×(2^16) is expressed as sixteen ones. If this value is kept in a data unit size of 16 bits, the maximum capacity of the data unit size is effectively reached. If a mathematical operation where to be performed on this value that increments it (e.g., an operation of +1 is performed on the value), an overload error would result because the value would need to carry over to a $17^{th}$ bit which is not available.

Programmers unfortunately do not typically check the upper bounds on the possible data values of their code's respective variables. As such, overflow errors are somewhat common. Worse yet, malware can specifically seek to cause such errors. In order to address these issues, programmers have the option to use so-called safe integers or other strongly typed languages. When using safe integer libraries operations are checked for overflow and underflow after every operation. This comes with a performance cost as new branches and entire subroutines have to be inserted into the program.

Figure 2A:
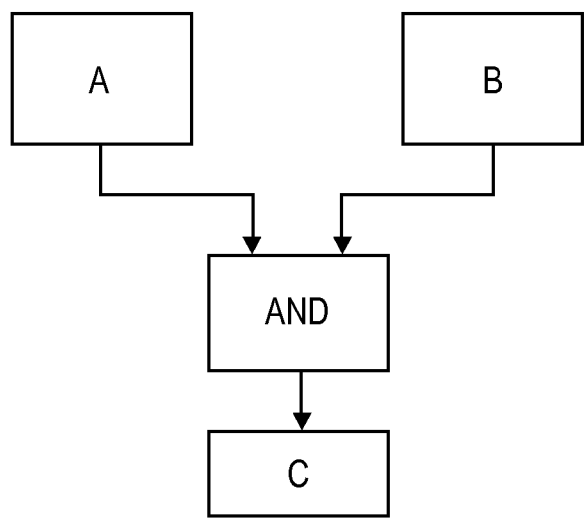
Figure 2B:
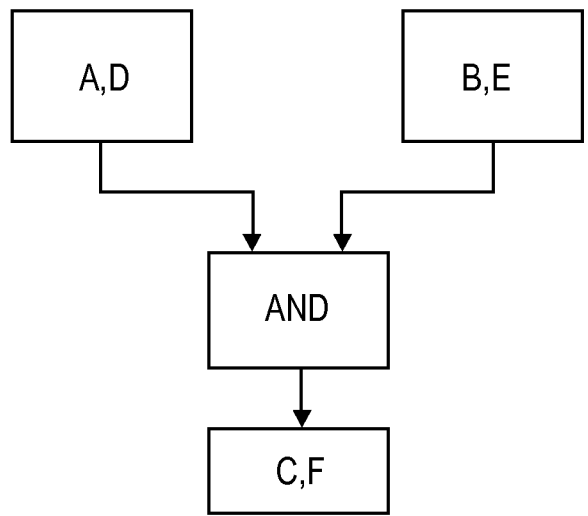
Figure 3:
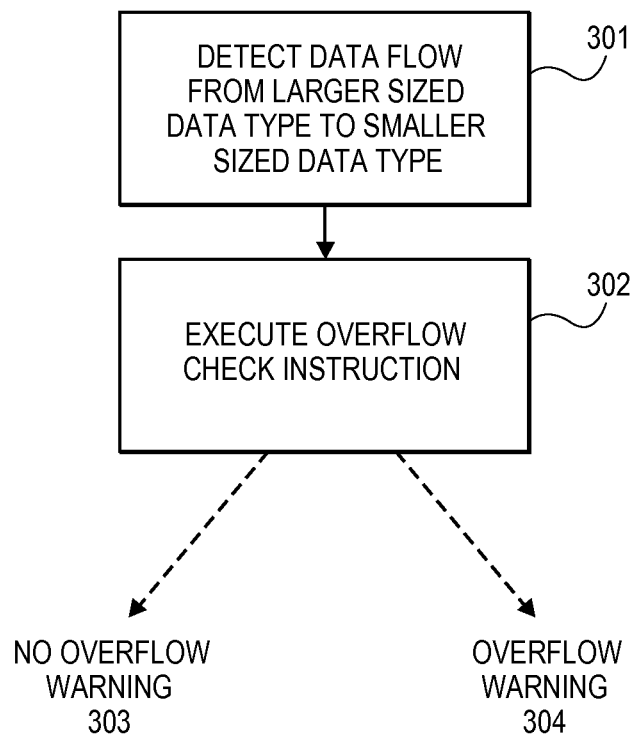
FIG. 3 shows a methodology that uses an instruction that checks for an overload condition.

FIG. 3 shows an improved approach that employs the use of an "overflow check" instruction within a processor's instruction set architecture (ISA) that is designed to determine whether or not an overflow condition exists. According to the methodology of FIG. 3, a data flow is detected from a larger sized data type to a smaller sized data type 301. Here, certain types of instructions may exist in the processor's ISA that broadcast, permute, shuffle, etc. a single source operand or multiple source operands of a first larger data size into a destination composed of a smaller data unit size. For example, a broadcast instruction may broadcast the lower half of a 32 bit source operand into each 16 bit element of a 2×16 vector resultant.

In response to the detection, an "overflow check" instruction is executed that tests whether the data flow will result in an overflow error 302. If the instruction determines that the data flow will not create an overflow condition, the instruction's resultant does not correspond to an overflow warning 303. If the instruction determines that the data flow will create an overflow condition, the instruction's resultant will correspond to some kind of overflow warning 304. For example, the warning 304 may take the form of an exception, interrupt or a flag (for convenience, exceptions or interrupts will be referred to hereafter as an exception).

An exception is essentially an error condition that automatically causes the program flow to be redirected to an error handler. An error handler is a software and/or hardware component that is specifically designed to handle different kinds of errors. Here, the exception thrown by the overflow condition will have some kind of identifier that the error handler uses to identify the specific corrective action that is to be applied for this particular type of error.

A flag is typically implemented as a bit in control register space of the instruction execution pipeline. Here, different flags exist in control register space to identify different conditions some of which need not be error conditions (e.g., equals zero, less than zero, etc.). In this particular approach, a flag bit is reserved in the control register space to indicate whether an overflow had been detected by the instruction that is designed to determine whether a larger data type can flow into a smaller data type. Here a conditional branch instruction may be automatically inserted between the overflow check instruction and the instruction that flows larger data to smaller data. The conditional branch instruction may be designed to look to the flag that is associated by the overflow condition instruction and jump program execution to some other location instead of executing the instruction that flows larger data to smaller data if the flag is set.

The detection 301 of the data flow from a larger size to a smaller data size may be performed by a compiler pre-runtime, or, in hardware during runtime. In the former case, the compiler identifies the larger-to-smaller data flow and inserts an overflow check instruction before the larger to smaller data flow. In the latter case, the hardware detects the larger-to-smaller data flow on the fly. In the case of instructions that inherently move data from a larger data size to a smaller data size, the compiler and/or hardware recognizes the existence of the instruction and effectively inserts the overflow check instruction before it in the instruction stream. Alternatively, a compiler's code creation process may simply automatically insert two instructions anytime a need for an instruction that causes larger to smaller data unit size flows is needed: a first preceding overflow check instruction and a second following instruction that is the larger-to-smaller data flow instruction. In the case of a compiler, the insertion may be made explicitly in the object code.

In the case of hardware, the instruction execution pipeline may have snoop circuitry in the instruction fetch stage that snoops the instruction queue and detects the presence of an instruction that causes larger to smaller data unit flow. In response, special circuitry within the instruction fetch stage creates an overload check instruction that assumes the data input operand content of the detected instruction and inserts the overload check instruction before the detected instruction in the instruction queue.

Figure 4:
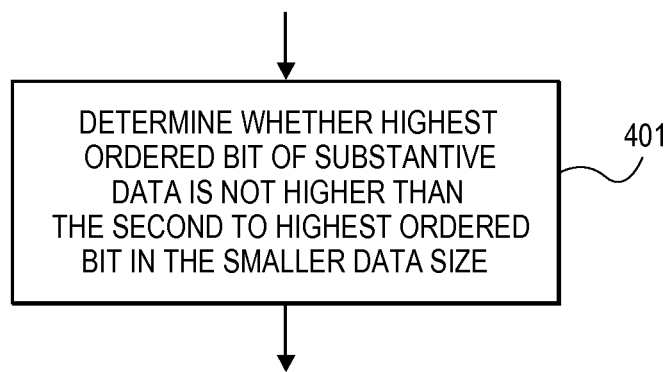
FIG. 4 shows a methodology for determining whether an overload condition exists.

FIG. 4 presents a method of operation for an overload detection instruction. As observed in FIG. 4, the instruction determines whether a highest ordered bit of the substantive data in the operand is not higher than the second to highest ordered bit in the resultant data size 401. For example, if the resultant is 16 bits, the instruction determines if the substantive data of the input operand reaches the $16^{th}$ of the 16 bits. If it does, an overload warning is raised. If it does not, no overload error warning is raised. Note that this particular process essentially seeks to confirm that the highest ordered bit of the input operand's substantive data is unused. By so doing, the instruction is allowing for a subsequent increment of the substantive data. That is, the overload checking instruction ensures that an overload error will not result if a subsequent increment is made of the substantive data as it sits in its new, smaller data store allocation.

Figure 5:
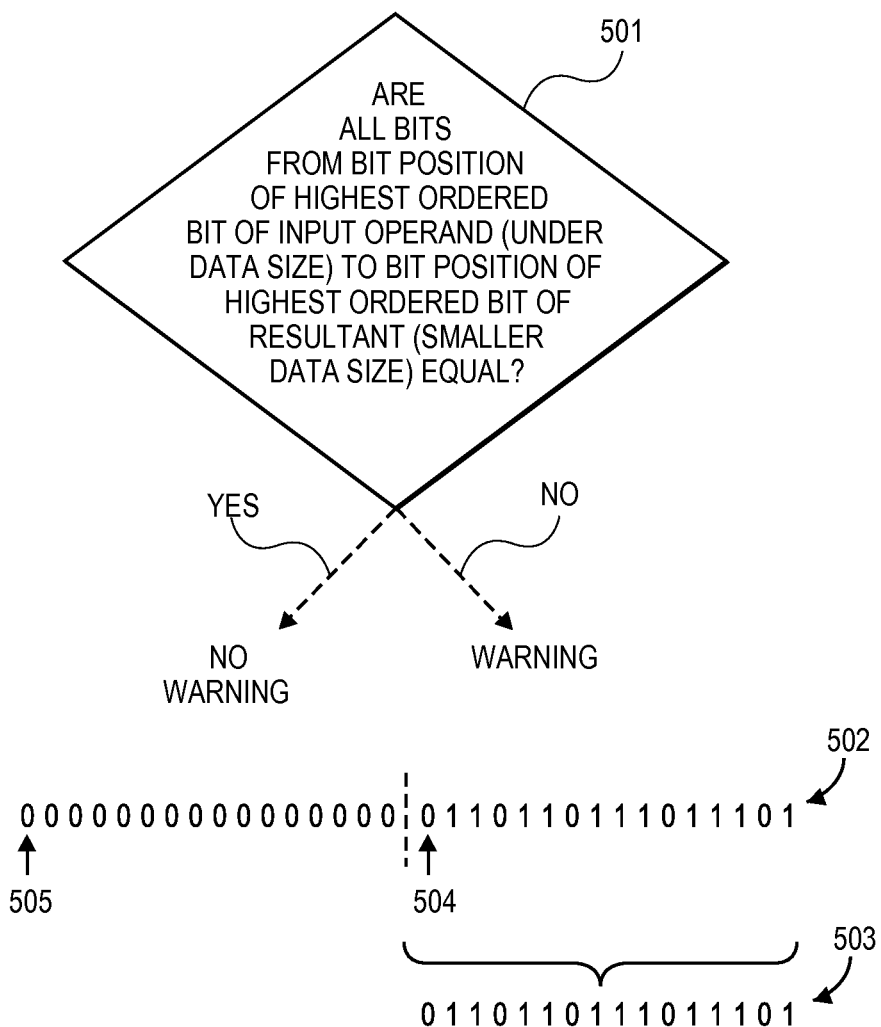
FIG. 5 shows another methodology for determining whether an overload condition exists.

FIG. 5 shows an embodiment of a method for determining whether the highest ordered bit in the resultant is not consumed by the input operand's substantive data. As observed in FIG. 5, the instruction checks to see if the bit values of the input operand starting from a bit location that corresponds to the highest ordered bit in the resultant all they way through the highest ordered bit of the input operand are equal 501. FIG. 5 shows a particular example for a 32 bit input operand 502 whose least significant 16 bits are to be mapped into a 16 bit resultant 503. The process 501 described just above identifies the highest ordered bit in the resultant 504 (the $16^{th}$ bit) and the highest ordered bit in the input operand 505 (the $32^{nd}$ bit) and checks that these bits and all bits in between are equal. As observed in the example of FIG. 5 all such bits are equal hence no overload error warning would be triggered.

This particular method is effective in the case of a processor that uses complementary notation to express negative numbers. Here, positive non-substantive digits are expressed as 0s (as observed in the example of FIG. 5) while negative, non-substantive digits are expressed as 1s. The particular method discussed above that checks for equality of digits between two marked bit locations is agnostic as to whether the bits are 1s or 0s and therefore is also agnostic as to whether the input operand is a positive or negative number.

Figure 6:
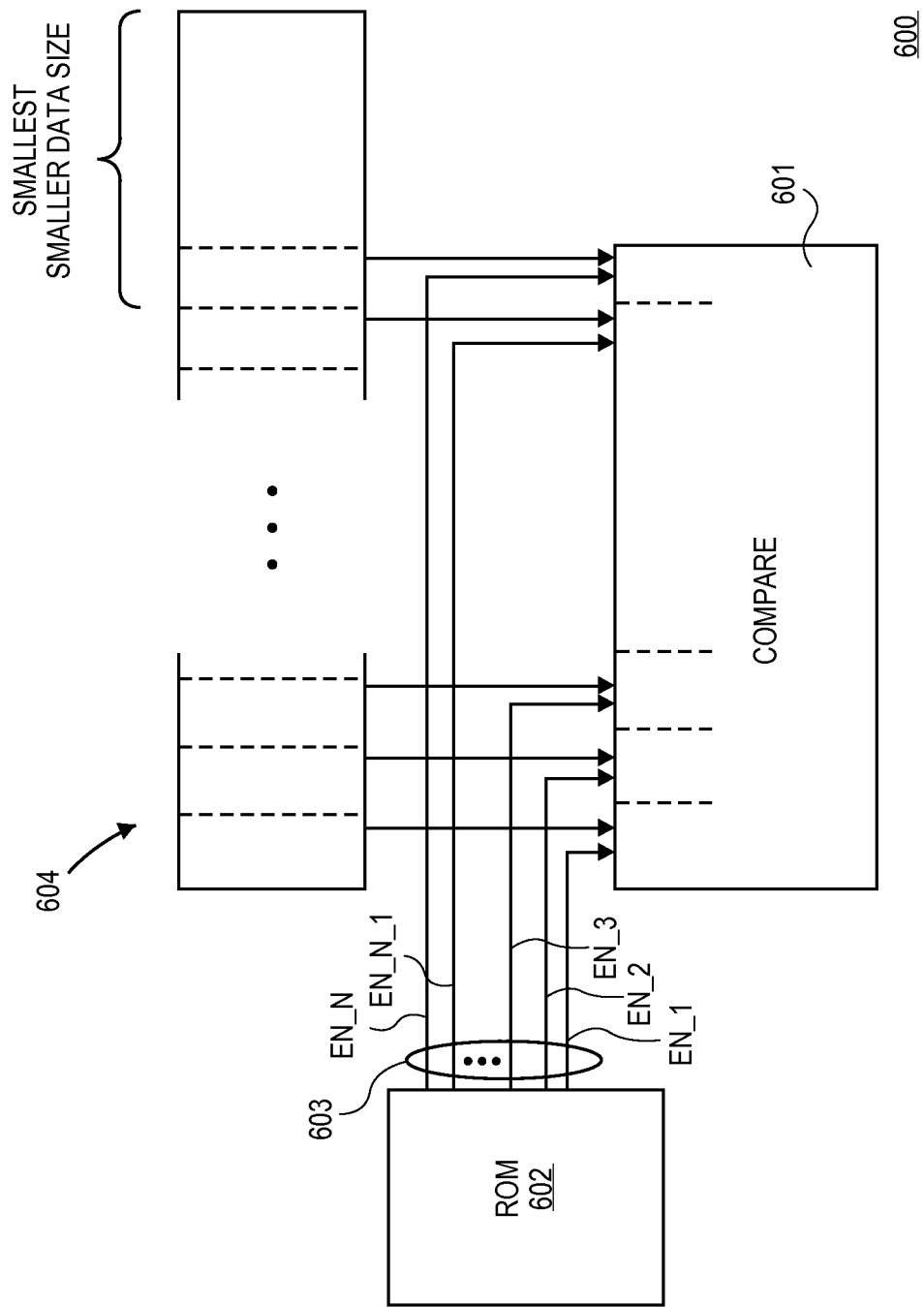
FIG. 6 shows an embodiment of a functional unit designed to check for an overload condition.

FIG. 6 shows a logic design 600 for an instruction execution pipeline functional unit. As observed in FIG. 6, the functional unit includes an N wide comparator 601 where N corresponds to the maximum number of bits that may need to be compared. Here it is assumed the functional unit 600 supports overload checking for a number of different larger to smaller data size flows. The input width of the comparator 601, which corresponds to how many input bits are compared for equality, is configured depending on the particular larger to smaller data size flow being performed.

For example, in an embodiment, the functional unit supports overload checking for each of: 1) a 64 bit data value to a 32 bit data value; 2) a 64 bit data value to a 16 bit data value; 3) a 64 bit data value to an 8 bit data value. The 64 bit to 32 bit flow corresponds to a 33 bit wide comparison, the 64 bit to 16 bit flow corresponds to a 49 bit wide comparison and the 64 bit to 8 bit flow corresponds to a 57 bit wide comparison. In this case, N would correspond to 57 because 57 is the maximum number of bits the functional unit would ever need to check equality for.

Thus, when the functional unit is asked to perform an overload check for a 64 bit to 8 bit data flow, the functional unit will enable all N=57 inputs to the comparator 601. For the 64 to 32 bit and 64 to 16 bit overload checks the functional unit will enable 33 and 69 of the comparator's inputs respectively. The comparator inputs to be enabled are counted from the most significant bit position of the input operand 604 toward the least significant bit position of the input operand. Here, in an embodiment, micro-code within a read only memory (ROM) 602 that is responsive to the instruction's opcode and/or immediate operand is used to set the enablement inputs 603_1 to 603_N for the respective inputs to the comparator 601. For example, if the instruction's opcode and/or immediate operand signify that a 64 bit to 8 bit overload check is to be performed, micro code within ROM 602 acts to enable all N=57 inputs of the comparator 601. The comparator 601 creates an exception or sets a flag, as discussed above, if the overload check fails.

The above discussion concerned the overload checking of a single scalar input operand such as a 64 bit or 32 bit integer. A various number of vector instructions may also perform larger to smaller data size flow operations. For example, permute or shuffle instructions may accept an input vector as an input operand and essentially create an output vector whose elements correspond to some kind of re-arrangement of one or more of the elements of the input vector (rather than some Boolean logic and/or mathematical operation performed on them). For example a permute instruction might forcibly re-arrange the input vector elements according to a fixed pattern that the permute instruction's logic is designed to implement. Different fixed patterns may be called upon by way of an immediate operand. A shuffle instruction may accept first and second input operands where each element of the second operand corresponds to an identically located element in the resultant and identifies one of the elements in the first operand as the element to be chosen for that resultant element location. Here, the second element is akin to a mask as discussed above with respect to FIG. 1. Either of these type of instructions may craft a resultant whose elements have a smaller size than the elements.

The logic circuitry of the functional unit 600 can be expounded to include functionality that not only contemplates vector instructions but also contemplates which specific elements of an input vector have been chose for selection in the resultant. For example, in the case where the overload checking instruction has been inserted just before a permute instruction, the instruction format of the overload checking instruction may include: i) the same immediate operand within the permute instruction that identifies the permutation pattern, and, ii) the input vector for the permute instruction whose elements are included in the permute instruction's resultant.

Here, the fixed pattern identified by the immediate operand may not select all elements of the input vector for inclusion in the resultant. The overload instruction is designed with logic that studies the immediate operand to identify which elements of the input vector are to appear in the resultant, and, checks each of the chosen elements for an overload error consistent with the principles discussed above.

Conceivably, a plurality of identical logic design instances 604 could be arranged in a single functional unit, e.g., one logic design instance for each vector element of the input operand to be processed, so that data elements of the input operand can be processed in parallel. Alternatively, if there are less design instances than the number of design elements that need to be processed, microcode can process a second element through a same functional unit after a first element has been processed so that the resultant is created in a piecemeal fashion.

In the case of a shuffle instruction, the functional unit 600 receives both input vectors (a first which defines which source elements are to be selected and a second which contains the source elements) so it can determine which specific data elements are to flow to a smaller size. Multiple logic design instances can process some or all of these data elements in parallel. To the extent less than all elements are processed in parallel, a single design instance can process a series of source elements so that the resultant is formed in a piecemeal fashion.

In an embodiment, the resultant of the overload check instruction, which may, for instance as described above be an exception or flag, identifies the offending data element(s) for a vector permute or shuffle instruction. For example, if the ISA supports permute and/or shuffle instructions that accept a source element input vector having a maximum of 32 elements, there may exist 32 flag bits in control register space that are used to separately identify any source element that does not pass the overload test. Less flag bits would be used for permute/vector instructions that generate fewer data elements. A similar data structure (e.g., 32 bits each corresponding to a permute can be passed with the exception.

To the extent the functional unit is to perform overload checking, the instruction execution pipeline has to be able to feed the appropriate operands to it. For example if the functional unit is to test both scalar and vector instructions, the instruction execution pipeline needs to couple both scalar and vector register space to the functional unit.

The above described embodiments were directed to a philosophy that attempted to prevent overload errors caused by an increment by ensuring that the highest ordered bit of the smaller targeted data size was not consumed by the substantive data within the larger source data size. In other embodiments this specific protection may be dropped such that the check will permit the highest (rather than only the second highest) ordered bit of the smaller target data size to be consumed by the substantive data. This affects input width calculations for the N wide comparator to lessen by one bit as compared to the discussion above. In an embodiment, which philosophy is to be adopted is established in the opcode or immediate operand of the instruction format (per instruction philosophy configuration), or, is established more globally on a per thread basis or processor wide basis by way of a setting within some form of register space such as hardware thread context register space or model specific register (MSR) space.

Figure 7:
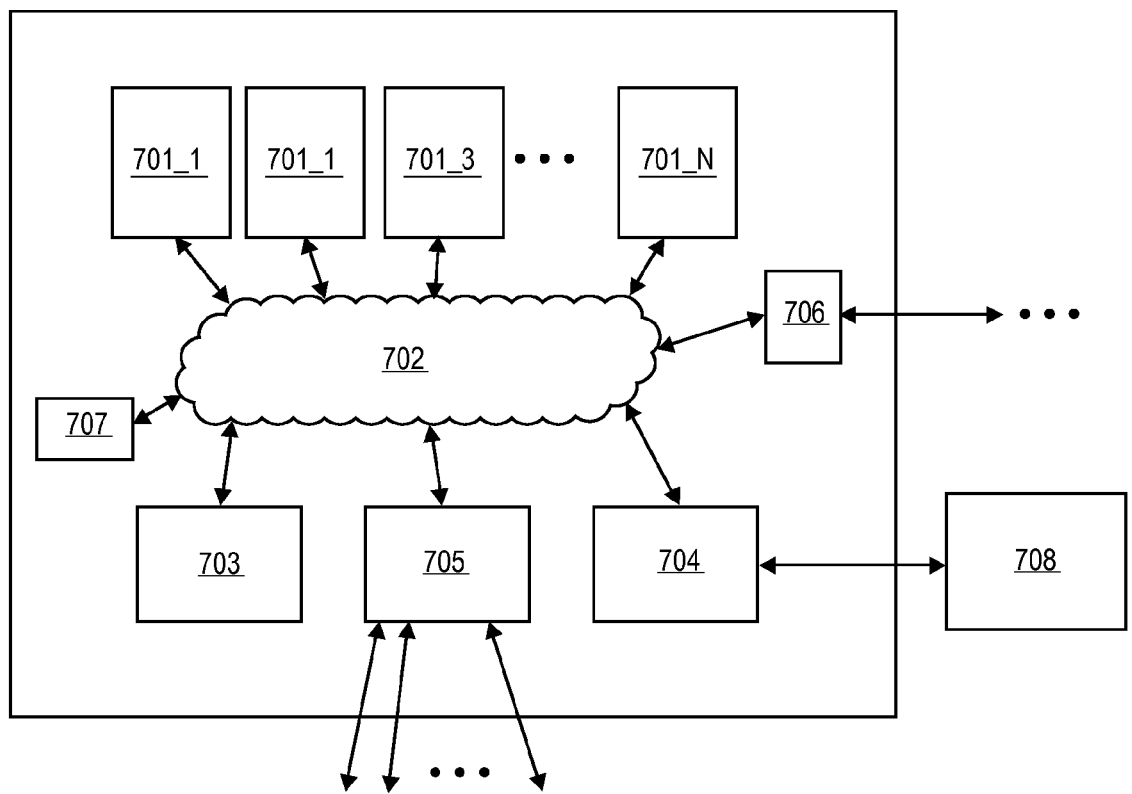
FIG. 7 shows an embodiment of a processor.

FIG. 7 shows the architecture of an exemplary multi-core processor 700. As observed in FIG. 7, the processor includes: 1) multiple processing cores 701_1 to 701_N; 2) an interconnection network 702; 3) a last level caching system 703; 4) a memory controller 704 and an I/O hub 705. Each of the processing cores contain one or more instruction execution pipelines for executing program code instructions. Any or all of such instruction execution pipelines may support the execution of vector instructions consistent with the description of FIG. 1, and, include a functional unit that can execute a overload check instruction as well as include circuitry to insert the overload check instruction into the instruction stream in response to the detection of an instruction that moves data from a larger to smaller data size. The interconnect network 702 serves to interconnect each of the cores 701_1 to 701_N to each other as well as the other components 703, 704, 705. The last level caching system 703 serves as a last layer of cache in the processor before instructions and/or data are evicted to system memory 708.

The memory controller 704 reads/writes data and instructions from/to system memory 708. The I/O hub 705 manages communication between the processor and "I/O" devices (e.g., non volatile storage devices and/or network interfaces). Port 706 stems from the interconnection network 702 to link multiple processors so that systems having more than N cores can be realized. Graphics processor 707 performs graphics computations. Power management circuitry (not shown) manages the performance and power states of the processor as a whole ("package level") as well as aspects of the performance and power states of the individual units within the processor such as the individual cores 701_1 to 701_N, graphics processor 707, etc. Other functional blocks of significance (e.g., phase locked loop (PLL) circuitry) are not depicted in FIG. 7 for convenience.

Processes taught by the discussion above may be performed with program code such as machine-executable instructions which cause a machine (such as a "virtual machine", a general-purpose CPU processor disposed on a semiconductor chip or special-purpose processor disposed on a semiconductor chip) to perform certain functions. Alternatively, these functions may be performed by specific hardware components that contain hardwired logic for performing the functions, or by any combination of programmed computer components and custom hardware components.

A storage medium may be used to store program code. A storage medium that stores program code may be embodied as, but is not limited to, one or more memories (e.g., one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)).

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A processor comprising:
a functional unit within an instruction execution pipeline, said functional unit having circuitry to execute a first instruction to determine whether substantive data from a larger data size is to fit within a smaller data size that said substantive data is to flow to; and
logic circuitry to detect a second instruction in an instruction stream that is to flow the substantive data from the larger data size to the smaller data size and insert said first instruction in the instruction stream before said second instruction.

2. The processor of claim 1 wherein said circuitry includes a comparator to check if bits starting from a bit position at said larger data size's highest ordered bit to a bit location within said smaller data size's bit range are all equal.

3. The processor of claim 2 wherein said bit location within said smaller data size's bit range is located at a highest ordered bit position of said smaller data size's bit range.

4. The processor of claim 1 wherein said circuitry includes a comparator to check if bits starting from a bit position at said larger data size's highest ordered bit to a bit location after said smaller data size's highest ordered bit are all equal.

5. The processor of claim 1 wherein said circuitry includes a comparator to check if bits starting from a bit position at said larger data size's highest ordered bit to either of i) or ii) below:
   i) a bit location after said smaller data size's highest ordered bit, or
   ii) a highest ordered bit location within said smaller data size's bit range are all equal, where which of i) or ii) is utilized depends on information.

6. The processor of claim 5 wherein whether said information is determined from content within an instruction format of an instruction executed by said functional unit.

7. The processor of claim 5 wherein whether said information is determined from control register space of said processor.

8. The processor of claim 7 wherein said control register space is model specific register space.

9. The processor of claim 7 wherein said control register space is to hold context information for a thread.

10. The processor of claim 1 wherein said substantive data is within an element of a vector.

11. The processor of claim 1, wherein the logic circuitry is to skip execution of the second instruction when the substantive data from the larger data size is to not fit within the smaller data size.

12. A method comprising:
detecting an operation that is to move substantive data from a larger data size to a smaller data size;
inserting an instruction in an instruction stream that is to be executed before said operation is to be performed in said instruction stream; and
executing the instruction within an instruction execution pipeline, said executing of said instruction check that the substantive data within the larger data size is to fit within the smaller data size, wherein said instruction's resultant is a warning if said substantive data does not fit within said smaller data size and no warning if said substantive data fits within said smaller data size.

13. The method of claim 12 wherein said substantive data is within a vector.

14. The method of claim 12 wherein said warning is a flag.

15. The method of claim 12 wherein said warning is an exception.

16. The method of claim 12, further comprising skipping execution of the operation when the substantive data within the larger data size does not fit within the smaller data size.

17. A non-transitory machine readable medium having stored thereon code that when processed by a processor causes said processor to perform a method, said method comprising:
- detecting an operation that is to move substantive data from a larger data size to a smaller data size; and
- inserting an instruction in an instruction stream that is to be executed before said operation is to be performed in said instruction stream, said instruction to check for an overflow condition associated with said move.

18. The non-transitory machine readable medium of claim 17 wherein said substantive data is within a vector.

19. The non-transitory machine readable medium of claim 17 wherein said instruction's instruction format informs a functional unit that is to execute said instruction of said smaller data size's size.

20. The non-transitory machine readable medium of claim 17, wherein the method further comprises adding program code to handle a warning generated by said instruction.

21. The non-transitory machine readable medium of claim 17, wherein the method further comprises skipping execution of the operation when the overflow condition exists.

\* \* \* \* \*